3,266,980
2,3,6-TRICHLOROPHENYLACETAMIDE FOR
PLANT DISEASE CONTROL
Jack S. Newcomer, Wilson, Edward D. Weil, Lewiston, and Edwin Dorfman, Grand Island, N.Y., assignors to Hooker Chemical Corporation, Niagara Falls, N.Y., a corporation of New York
No Drawing. Filed Jan. 10, 1963, Ser. No. 250,499
10 Claims. (Cl. 167—30)

This application is a continuation-in-part of Serial Number 776,176, filed April 22, 1958, and Serial Number 102,626, filed April 13, 1961, now abandoned.

This invention relates to the control of plant pathogenic microorganisms, both bacterial and fungal.

The diseases which afflict plants are generally divided into two categories of microorganisms, fungal and bacterial. Amongst bacterial pathogens, the genus Xanthomonas are responsible for many major plant diseases, including among others, bacterial blight of carrots, gummosis, leaf scald, and red stripe of sugar cane, citrus canker, bacterial streak of sorghum and other grasses, and bacterial canker of peaches and plums. Bacteria of the genus Pseudomonas are responsible for the following major plant diseases, among others: bacterial leaf spot of corn and celery, bacterial stripe of sorghum, oats and other grasses as well as bacterial canker of stone fruits and apples.

Each of these bacterial diseases causes severe economic loss to the grower and consumer through the reduction of yield and quality or even by total destruction of the crop. While there has been considerable work on the breeding of disease-resistant plant strains, to reduce these losses, only limited success has thus far been obtained. The reasons for this limited success are the difficulty and time consuming nature of the work, the ability of the bacteria to develop resistant mutant pathogen strains and the great difficulty and sometimes impossibility of finding totally resistant strains which fulfill the other requirements of commercial plant growers, such as good yield, short growing season and hardiness. Thus, there exists a real need for active chemotherapeutic agents and methods to control bacteria which adversely affect plants, particularly the economically significant bacteria of the Xanthomonas and Pseudomonas genera.

A major class of unsolved plant disease problems may be described by the term "vascular diseases." These vascular diseases include bacterial as well as fungal infections of the conducting tissue of plants. In the bacterial group may be mentioned bacterial wilts of corn and other crops. In the fungal group, some major examples are Fusarium wilts, Verticillium wilts, and the wilts caused by Ceratocystis fungi. In the latter category occur some of the major tree diseases of North America, for instance Dutch elm disease and oak wilt.

The Dutch elm disease was discovered in the United States in 1930. Since then, it has spread rapidly and now covers almost the entire range of the American elm. Unchecked, the disease may render substantially extinct this valuable and attractive shade tree, of which there are still an estimated one billion specimens in the United States. Many localities have lost most of their population of shade trees and have been obliged to go to great expense to remove the dead or dying elms. The economic as well as aesthetic loss has become a matter of great concern to municipalities and private landowners.

The Dutch elm disease is caused by a fungus, *Ceratostomella ulmi* (also sometimes named as *Ceratocystis ulmi*) which, when introduced into the water-conducting vessels of the tree, multiplies rapidly therein, causing the leaves to wilt and the tree thereafter to die. The disease is introduced into healthy elms by elm bark beetles which feed on twigs and on small branches. The beetles pass the winter as larvae or grubs in the bark of dead elms. In early spring, the winged adults emerge, infested with spores of the fungus, and fly to living elm trees where they bore into twigs to feed, thereby introducing the fungal spores into the new host tree.

Once in the host elm, the fungus spreads throughout the vascular system of the tree, causing its death. The mechanism by which the fungus kills the tree is not well understood; the damage caused by the fungus may involve toxins produced by it, disruption of the normal biochemistry of the tree, or mechanical blockage of the vascular tissue, or a combination of these causes.

Oak wilt is a disease having a similar etiology. The fungus (*Ceratocystis fagacearum*) is spread by natural root grafts or by carriers such as insects, and causes obstruction of the vascular tissue of the tree, resulting in wilting and death.

We have found quite surprisingly that 2,3,6-trichlorophenylacetamide has preventative and remedial activity against the development of symptoms caused by bacterial and fungal diseases of plants. Especially remarkable activity has been found against the development of symptoms of diseases caused by Xanthomonas and Pseudomonas bacteria and by Ceratocystis fungi. In the control of symptoms caused by fungus diseases, 2,3,6-trichlorophenylacetamide is found to appear to function as a chemotherapeutant agent in deciduous trees, such as elms and oaks, therein for it both prevents the development of such symptoms and reduces their development where they already exist on such trees.

Various application techniques can be employed for treating the crops with the compound herein described. For example, the active compound may be mixed with an inert carrier and then may be applied either as a dust or spray. The compound may be used by itself in a state of purity ranging from the crystalline pure to technical crudes. On the basis of economics, it is preferred to employ the technical form of 2,3,6-trichlorophenylacetamide which contains from between about 35 to about 75 percent of the 2,3,6-isomer accompanied by between about 25 to about 65 percent of other isomers, principally the 2,4, 5-, 2,3,4- and 2,4,6-isomers. Alternatively, the active composition may be formulated in preparations and mixtures ranging from the very simple to the complex. Such formulations or compositions facilitate handling and application and sometimes enhance its effectiveness.

2,3,6-trichlorophenylacetamide may be formulated by mixing it with inert carriers, including conventional adjuvants, modifiers, diluents and conditioning agents to provide compositions in the form of solutions, emulsions, dispersions, powders wettable or dispersible in water or other solvents, dusts, granules or pellets. Thus, it lends itself to use with a carrier or diluent agent such as a finely divided solid, a solvent liquid or organic in origin, water, a surface active agent, or aqueous emulsion or any suitable combination of one or more of any of these.

When the active material employed in this invention is to be made up as a liquid composition, water, alcohols, ketones, glycols, vegetable oils and other suitable liquids may be used as solvents, diluents or as dispersing media. These liquid compositions, whether solutions or dispersions of the active fungicides in a liquid solvent, may contain one or more surface active agents in amounts sufficient to render the composition readily dispersible in water. By the term surface active agent is meant wetting agents, dispersing agents, emulsifying agents and the like. A list of such typical adjuvants and agents appear in "Soap and Chemical Specialties," vol. 31, No. 7, pages 50 to 61; No. 8, pages 48 to 61; No. 9, pages 52 to 67 and No. 10, pages 38 to 67 (1955).

When the active material is to be made up as a solid formulation, they may be prepared by diluting, dispersing or mixing the active compound with inert solid carriers such as clay, talc, flours, diatomaceous earth, sawdust, the alkaline earth carbonates, phosphates and the like.

Similarly, a composition for application to crops or croplands may be combined with fertilizers, such as urea and ammonium nitrate and potash; fungicides, such as sulfur, metal dimethyldithiocarbamates and metal ethylene bis-(dithiocarbamates); or with insecticides, exemplified by benzene hexachloride, chlordane, DDT, phosphates, carbamates and the like.

In application to crops such as corn, sorghum, sugar cane, and the like, spraying of the compound onto the crop or the soil or admixture with the soil (such as by discing) may be employed. Rates of 0.1–20 pounds per acre represent a typical range for such application, the preferred rate in any case depending on soil type, climate, nature of crop, nature of disease, economics, and other considerations.

Application to trees is considerably more specialized in regard to procedure. Methods of application encompassed within the scope of the invention comprise any method for introducing the chemical into the vascular tissue of the trees. Such methods include, but are not limited to the following:

(1) Dormant spraying of twigs before bud break;
(2) Spraying of foliage;
(3) Injection as a solution into trunk, or implantation as a solid into the trunk;
(4) Spraying or painting onto the trunk, especially near the base, using as a penetrating formulation a solution in an organic solvent, e.g., mineral oil, vegetable oil, aliphatic ketones, alcohols, or esters, or a water solution, preferably containing wetting agents;
(5) Spraying or distributing the chemical as a liquid, powder, or granular formulation onto the soil surface around the tree, depending on leaching, by rainfall, to carry it into the root zone; and
(6) Subsurface injection or insertion of the chemical in a liquid or solid formulation, into the root zone.

This list is not exhaustive; other methods may also be employed to introduce the active agent.

For control of the development of symptoms of tree disease, 2,3,6-trichlorophenylacetamide may be used in the pure form, but it is usually formulated to facilitate application and to favor penetration. Such formulations include (a) water solutions of the salts, (b) oil solutions of the free acids, their esters, or their long-chain fatty amine salts, (c) granular formulations of any of the compounds, on a carrier such as clay, vermiculite, or fertilizer, and (d) water/organic solvent emulsions of the free acids or their esters.

For method (1), formulation (b) is most suited, for method (3), formulation (a) is most suited, for method (4), formulation (b) and (d) are most suited and for methods (5) and (6), formulations (a), (c), or (d) are most suited.

For best results in preventing the development of symptoms of infection in elm trees, the trees are treated before the adult elm bark beetles introduce the infection into the tree. When symptoms, such as wilting of leaves, indicate that infection has occurred, but before it has spread throughout the tree, treatment with the indicated chemotherapeutic agents retards or prevents the spread of the symptoms of infection.

It is within the scope of the invention, in its control of symptoms of tree disease aspects, to combine the indicated compounds with insecticides such as DDT, systemic phosphate insecticides, systemic carbamate insecticides, or with fungicides such as 8 - hydroxy - quinoline benzoate, or with fertilizers such as urea, or trace nutrients such as iron salts or chelates.

The following examples are given to illustrate the invention further, but are not to be construed as limiting.

EXAMPLE 1.—PREPARATION OF 2,3,6-TRICHLOROPHENYLACETAMIDE

A quantity of 2,3,6-trichlorotoluene prepared as suggested by Brimelow et al. in J. Chem. Soc., 1208 (1957), is placed in a standard chlorination vessel and elemental chlorine is introduced into the trichlorotoluene under the influence of a two hundred and fifty watt mercury lamp to produce side chain chlorination while the reaction mixture is maintained at a temperature between about ninety degrees and about one hundred and thirty degrees centigrade. When about seventy to eighty mole percent of the amount of chlorine theoretically necessary to produce monochlorination in the side chain has been introduced, the passage of chlorine is interrupted, and the reaction product is fractionated to recover the 2,3,6-trichlorobenzyl chloride so produced.

To a solution of 37.5 parts of sodium cyanide in forty parts of water and one hundred and fifty parts of ethyl alcohol at reflux was added slowly one hundred and thirty-eight parts of 2,3,6-trichlorobenzyl chloride. After refluxing for four and one-half hours, the mixture was filtered, evaporated to remove the alcohol, and the residual solids recrystallized several times from aqueous methanol. The product was a colorless crystalline solid melting at 58.9 degrees centigrade, and identified as 2,3,6-trichlorobenzyl cyanide. The yield under the above described conditions was seventy percent.

The cyanide was added to five parts by weight of technical concentrated sulfuric acid at ninety to one hundred degrees centigrade and the solution held at this temperature for ten minutes, then poured into water. The precipitated amide was filtered out, washed with water, and dried to obtain a nearly quantitative yield of colorless crystalline solid, melting point one hundred and ninety-two to one hundred and ninety-three degrees centigrade.

$Analysis.$—Calcd. for $C_8H_6ONCl_3$: Cl, 44.7%; N, 5.9%. Found: Cl, 45.1%, N, 5.8%.

EXAMPLE 2.—PREPARATION OF A WETTABLE POWDER FORMULATION

The following ingredients are blended:

| | Parts by weight |
|---|---|
| 2,3,6-trichlorophenylacetamide | 50 |
| Lignin sulfonate dispersing agent | 10 |
| Sodium alkylnaphthalene sulfonate (wetting agent) | 2 |
| Clay | 38 |

The above mixture is ground in a hammer mill to a particle size finer than three hundred mesh.

EXAMPLE 3.—PREPARATION OF A GRANULAR FORMULATION

One part by weight of 2,3,6-trichlorophenylacetamide is melted and sprayed at one hundred and fifty degree centigrade, onto nine parts by weight of tumbling hot clay particles, twenty-forty mesh, and cooled to obtain a ten percent granular formulation which has free flowing characteristics.

EXAMPLE 4.—COMPARATIVE EFFECTIVENESS OF 2,3,6-TCPA AND RELATED COMPOUNDS VERSUS BACTERIA

The test compounds are mixed with nutrient agar at 0.02 percent and the agar plates inoculated with spores of *Pseudomonas phaseolicola* and *Xanthomonas phaseoli*.

The percent of area growth of the colony relative to untreated agar plates was observed.

*Percent inhibition of growth*

| Compound | P. Phraseolicola | X. Phaseoli |
|---|---|---|
|  | Percent | Percent |
| 2,3,6-trichlorophenylacetamide | 100 | 100 |
| 2,3,6-trichlorophenylthioacetamide | 30 | 0 |
| N-methyl-2,3,6-trichlorophenylacetamide | 0 | 0 |
| N,N'-ethylenebis-2,3,6-trichlorophenylacetamide | 0 | 0 |
| 2,3,6-trichlorophenylacetic acid (buffered to pH 7) | 0 | 0 |
| 2,4,5-trichlorophenylacetamide | 10 | 10 |

EXAMPLE 5

Sugar cane seed pieces infected with *Xanthomonas vasculorum* are planted in soil treated with ten parts per million of 2,3,6-trichlorophenylacetamide. Similarly, infected seed pieces are simultaneously planted in untreated soil. At a time two to three months later, vigorous cane shoots are observed in treated soil, whereas in the control, retardation, poor vigor, and vascular disease symptoms are in evidence.

EXAMPLE 6

Six small elms (10–15' high) were sprayed at the full leaf stage with 1 pound per acre of 2,3,6-trichlorophenylacetamide dispersed in water as a wettable powder. One week later, these trees as well as six untreated elms of similar size were inoculated with spores of *Ceratocystis ulmi* by scraping away small patches of bark and applying an aqueous spore suspension.

Four months later, the untreated trees were severely wilted and exhibited the characteristic symptoms of Dutch elm disease whereas the disease symptoms were absent in the treated trees.

EXAMPLE 7

Six twenty-foot elms were injected with a 5 parts per million aqueous dispersion of 2,3,6-trichlorophenylacetamide (as wettable powder), using about 5 liters of the dispersion. The injection was conducted by allowing the dispersion to flow by gravity through a plastic tube into a tightly fitted inlet inserted into the sapwood, wherefrom the liquid was taken up by the transpiration suction of the tree. After one week, these trees as well as untreated check trees were inoculated with spores of Dutch elm disease.

Three months later, the treated trees were found to exhibit no symptoms of Dutch elm disease, whereas the untreated elms were in moribund condition.

Similar results were obtained by implanting a total of 0.1 gram of 2,3,6-trichlorophenylacetamide in crude form (admixture with about equal weight of 2,4,5-, 2,4,6-, and 2,3,4-isomers) under the bark in the xylem at 4" intervals around the circumference of the elms.

Although the present invention has been described in connection with the specific details of certain embodiments thereof, it is not intended that such details shall be considered as limitations upon the scope of the invention.

We claim:

1. A method for the treatment of trees to reduce the development of symptoms of vascular tree diseases caused by microorganisms which comprises applying to the locus of the tree a non-phytotoxic vascular tree disease symtom-reducing amount of 2,3,6-trichlorophenylacetamide.

2. The method of claim 1 wherein the compound is applied to the twigs before bud break.

3. The method of claim 1 wherein the compound is applied to the trunk of the tree.

4. The method of claim 1 wherein the compound is injected into the sapwood.

5. The method of claim 1 wherein the compound is implanted as a dry solid into the sapwood.

6. The method of claim 1 wherein the said compound is applied to elm trees.

7. The method of claim 6 wherein the compound is applied to the elms before the adult winged elm bark bettles introduce the infection into the trees.

8. A method for controlling plant diseases caused by microorganisms which comprises applying to the locus of plants to be treated a chemotherapeutic amount of 2,3,6-trichlorophenylacetamide.

9. A method of controlling plant pathogenic bacteria which comprises applying a bacteristatic composition of matter having as its active ingredient 2,3,6-trichlorophenylacetamide, in a bacteristatic amount to the locus of plant to be treated.

10. A method for the control of plant pathogenic bacterial which comprises applying to the locus of plants to be treated a bacteristatic amount of a bacteristatic composition containing as an essential ingredient 2,3,6-trichlorophenylacetamide in admixture with a surface active agent and a diluent selected from the group consisting of inert liquids and solid carriers.

References Cited by the Examiner

UNITED STATES PATENTS 2,977,212   3/1961   Tischler _____ 260—558

JULIAN S. LEVITT, *Primary Examiner.*

S. J. FRIEDMAN, *Assistant Examiner.*